(12) United States Patent
Shand (10) Patent No.: US 7,792,991 B2
(45) Date of Patent: Sep. 7, 2010

(54) METHOD AND APPARATUS FOR ADVERTISING A LINK COST IN A DATA COMMUNICATIONS NETWORK

(75) Inventor: Ian Michael Charles Shand, Cobham (GB)

(73) Assignee: Cisco Technology, Inc., San Jose, CA (US)

( * ) Notice: Subject to any disclaimer, the term of this patent is extended or adjusted under 35 U.S.C. 154(b) by 1902 days.

(21) Appl. No.: 10/323,358

(22) Filed: Dec. 17, 2002

(65) Prior Publication Data

US 2004/0117251 A1 Jun. 17, 2004

(51) Int. Cl.
G06F 15/173 (2006.01)
(52) U.S. Cl. .......................... 709/241; 709/238; 709/242
(58) Field of Classification Search .................. 709/227, 709/242, 241, 238
See application file for complete search history.

(56) References Cited

U.S. PATENT DOCUMENTS

| 5,243,592 | A | 9/1993 | Perlman et al. |
|---|---|---|---|
| 5,253,248 | A | 10/1993 | Dravida et al. |
| 5,265,092 | A | 11/1993 | Soloway et al. |
| 5,430,727 | A | 7/1995 | Callon |
| 5,999,286 | A | 12/1999 | Venkatesan |
| 6,018,576 | A | 1/2000 | Croslin |
| 6,032,194 | A | 2/2000 | Gai et al. |
| 6,321,271 | B1 | 11/2001 | Kodialam et al. |
| 6,349,091 | B1 | 2/2002 | Li |
| 6,363,319 | B1 | 3/2002 | Hsu |
| 6,449,279 | B1 | 9/2002 | Beiser et al. |
| 6,473,421 | B1 | 10/2002 | Tappan |
| 6,507,577 | B1 | 1/2003 | Mauger et al. |
| 6,535,481 | B1 | 3/2003 | Andersson et al. |
| 6,578,086 | B1 | 6/2003 | Regan et al. |
| 6,668,282 | B1 | 12/2003 | Booth et al. |
| 6,690,671 | B1 | 2/2004 | Anbiah et al. |
| 6,697,325 | B1 | 2/2004 | Cain |
| 6,697,333 | B1 | 2/2004 | Bawa et al. |
| 6,724,722 | B1 | 4/2004 | Wang et al. |
| 6,744,727 | B2 | 6/2004 | Liu et al. |
| 6,944,131 | B2 | 9/2005 | Beshai et al. |

(Continued)

FOREIGN PATENT DOCUMENTS

CN 1440159 A 9/2003

(Continued)

OTHER PUBLICATIONS

Mikkel Thorup, "Fortifying OSPF/IS-IS against link-failure," Sep. 7, 2001, pp. 01-10.*

(Continued)

*Primary Examiner*—John Follansbee
*Assistant Examiner*—Nghi V Tran
(74) *Attorney, Agent, or Firm*—Hickman Palermo Truong & Becker LLP (57) ABSTRACT

A method is described of advertising a link cost in a data communication network having as components nodes and links. A node detects a change of state of an adjacent component. The change of state can be between an activated and a deactivated state or vice versa. The node varies an associated link cost by an incremental value and advertises the varied cost.

45 Claims, 5 Drawing Sheets

U.S. PATENT DOCUMENTS

| | | | |
|---|---|---|---|
| 6,982,951 | B2 | 1/2006 | Doverspike et al. |
| 6,990,068 | B1 | 1/2006 | Saleh et al. |
| 6,993,593 | B2 | 1/2006 | Iwata |
| 7,058,016 | B1 | 6/2006 | Harper |
| 7,065,059 | B1 | 6/2006 | Zinn |
| 9,009,286 | | 8/2006 | Swallow |
| 7,113,481 | B2 | 9/2006 | Elie-Dit-Cosaque et al. |
| 7,158,486 | B2 | 1/2007 | Rhodes |
| 7,248,579 | B1 | 7/2007 | Friedman |
| 7,349,427 | B1 | 3/2008 | Canning et al. |
| 7,500,013 | B2 | 3/2009 | Dziong et al. |
| 2002/0093954 | A1 | 7/2002 | Weil et al. |
| 2002/0112072 | A1 | 8/2002 | Jain |
| 2002/0116669 | A1 | 8/2002 | Jain |
| 2002/0131362 | A1 | 9/2002 | Callon |
| 2002/0136223 | A1 | 9/2002 | Ho |
| 2002/0171886 | A1 | 11/2002 | Wu et al. |
| 2003/0063613 | A1 | 4/2003 | Carpini et al. |
| 2003/0161338 | A1 | 8/2003 | Ng et al. |
| 2004/0001497 | A1 | 1/2004 | Sharma |
| 2004/0001508 | A1 | 1/2004 | Zheng et al. |
| 2004/0071089 | A1 | 4/2004 | Bauer et al. |
| 2004/0085894 | A1 | 5/2004 | Wang et al. |
| 2004/0088429 | A1 | 5/2004 | Luo |
| 2004/0190454 | A1 | 9/2004 | Higasiyama |
| 2004/0203827 | A1* | 10/2004 | Heiner et al. ............ 455/452.1 |
| 2005/0007950 | A1 | 1/2005 | Liu |
| 2005/0031339 | A1 | 2/2005 | Qiao et al. |
| 2005/0097219 | A1 | 5/2005 | Goguen et al. |
| 2005/0201273 | A1 | 9/2005 | Shimizu |
| 2005/0281271 | A1* | 12/2005 | Beshai et al. ............... 370/400 |
| 2006/0031482 | A1 | 2/2006 | Mohan et al. |
| 2006/0050630 | A1 | 3/2006 | Kobayashi et al. |
| 2006/0092941 | A1 | 5/2006 | Kusama |
| 2007/0011284 | A1 | 1/2007 | Le Roux et al. |
| 2007/0038767 | A1 | 2/2007 | Miles et al. |

FOREIGN PATENT DOCUMENTS

| | | |
|---|---|---|
| WO | WO 02/06918 | 1/2002 |
| WO | 0223832 A2 | 3/2002 |
| WO | WO 02/23832 A2 | 3/2002 |

OTHER PUBLICATIONS

Zheng Wang et al., "Shortest Path First with Emergency Exists," ACM 089791-405-8/90/0009/0166, 1990, pp. 166-176.*

Mikkel Thorup, "Fortifying OSPF/IS-IS against link-failure," Sep. 7, 2001, pp. 1-10.

International Searching Authority, International Search Report, PCT/US04/33827, dated Mar. 28, 2005, 8 pages.

Current Claims, PCT/US04/33827, 6 pages.

Canadian Intellectual Property Office, Office Action, foreign application No. 2,509,359, 3 pages.

Claims, application No. 2,509,359, 3 pages.

Fei Dai et al., "On Independently Finding Converging Paths in Internet," 2001, pp. 1-13.

Paolo Narváez et al., "Local Restoration Algorithm for Link-State Routing Protocols," 1998, 6 pages.

Jie Wu et al., "An Extended Fault-Tolerant Link-State Routing Protocol in the Internet," 2001, 7 pages.

Paolo Narváez et al., "Fault-Tolerant Routing in the Internet without Flooding," 1998, pp. 1-13.

Takuya Yoshihiro, "Design and Analysis of Routing Algorithms toward the Next Generation Internet," Dec. 2002, 98 pages.

Wang, Zheng et al., "Shortest Path First with Emergency Exits," ACM 089791-405-8/90/0009/0166, 1990, pp. 166-176.

AU Examiner's First Report for foreign patent application No. 2004311004 dated Jun. 23, 2008 (1 pg).

AU Examiner's Second Report for foreign patent application No. 2004311004 dated Aug. 18, 2008 (1 pg).

Current claims for AU foreign patent application No. 2004311004 (6 pgs).

Office Action from CN for foreign application No. 200480033007.8 dated Apr. 11, 2008 (10 pgs) with English translation (11 pgs).

Current claims for CN foreign patent application No. 200480033007.8 (6 pgs).

ISO/IEC 10589: "Information technology—Telecommunications and information exchange between systems—Intermediate System to Intermediate System intra-domain routeing information exchange protocol for use in conjunction with the protocol for providing the connectionless-mode network service", (ISO 8473), Second edition, Nov. 15, 2002, 208 pages.

Canadian Intellectual Property Office. Requisition. Method and Apparatus For Advertising a Link Cost In a Data Communications Network. Application No. 2509359. Mar. 26, 2008, pp. 1-3.

European Patent Office, "Supplementary European Search Report", application No. EP 04795045, May 27, 2009, 4 pages.

Claims, application No. EP 04795045, 4 pages.

Raju et al., "A New Approach to On-Demand Loop-Free Multipath Routing", Computer Communications and Networks, 1999, IEEE, Oct. 1999, XP010359531, ISBN: 978-0-7803-5794-5, 6 pages.

European Search Report in Application No. 05749440.3 dated Dec. 4, 2009 (3 pages).

Current Claims—Application No. 05749440.3 dated Jan. 2010 (3 pages).

European Patent Office, "Communication pursuant to Article 94(3) EPC", Application No. 04795045.6-2416, dated Sep. 7, 2009, 5 pages.

Current Claims, Application No. 04795045.6-2416, 5 pages.

* cited by examiner

METHOD AND APPARATUS FOR ADVERTISING A LINK COST IN A DATA COMMUNICATIONS NETWORK

FIELD OF THE INVENTION

The present invention generally relates to link costs in a data communications network. The invention relates more specifically to a method and apparatus for advertising a link cost in a data communications network.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of links (communication paths such as telephone or optical lines) and nodes (usually routers directing the packet along one or more of a plurality of links connected to it) according to one of various routing protocols.

One such protocol is the link state protocol. The link state protocol relies on a routing algorithm resident at each node. Each node on the network advertises, throughout the network, links to neighboring nodes and provides a cost associated with each link which can be based on any appropriate metric such as link bandwidth or delay and is typically expressed as an integer value. A link may have an asymmetric cost, that is, the cost in the direction AB along a link may be different from the cost in a direction BA. Based on the advertised information in the form of a link state packet (LSP) each node constructs a link state database (LSDB) which is a map of the entire network topology and from that constructs generally a single optimum route to each available node based on an appropriate algorithm such as, for example a shortest path first (SPF) algorithm. As a result a "spanning tree" is constructed, rooted at the node and showing an optimum path including intermediate nodes to each available destination node. Because each node has a common LSDB (other than when advertised changes are propagating around the network) any node is able to compute the spanning tree rooted at any other node.

As a result when a packet for a destination node arrives at a node (which we term here the "first node"), the first node identifies the optimum route to that destination and forwards the packet to the next node along that route. The next node repeats this step and so forth.

It will be noted, therefore, that each node decides, irrespective of the node from which it received a packet, the next node to which the packet should be forwarded. In some instances this can give rise to a "loop". In particular this can occur when the databases (and corresponding forwarding information) are temporarily de-synchronized during a routing transition, that is, where because of a change in the network, a new LSP is propagated. As an example if node A sends a packet to node Z via node B, comprising the optimum route according to its SPF, a situation can arise where node B, according to its SPF determines that the best route to node Z is via node A and sends the packet back. This can continue indefinitely although usually the packet will have a maximum hop count after which it will be discarded. Such a loop can be a direct loop between two nodes or an indirect loop around a circuit of nodes.

In conventional systems, when a link fails this is identified by an adjacent node in a medium specific manner. This instigates a routing transition whereby the neighboring node advertises the link failure to the remainder of the network. This can be done by simply removing the link from the LSP or, in some circumstances, setting its cost to an integral value high enough to direct all traffic around the failed link. This value is often termed "infinity" and it will be seen that the approaches are effectively the same.

However the LSP advertising the failure takes a finite time to propagate through the network and each node must then re-run its SPF and pass the newly generated routes down to its forwarding mechanism as a result of which there will be inconsistencies between the LSDBs maintained at different nodes on the network. In some circumstances this can give rise to the loops discussed above which may persist until the LSDBs are once more consistent, which can take several hundred milliseconds.

Figure 1:
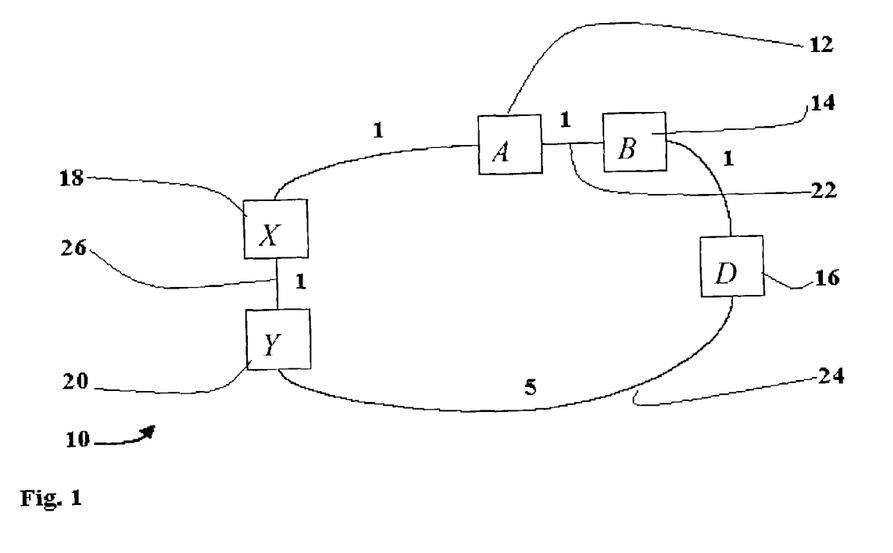
FIG. 1 is an illustrative network diagram showing a potential route configuration.

The underlying causes of looping can be better understood with reference to FIG. 1.

A simple network is shown designed generally 10 and including nodes A, B, D, X, Y reference numerals 12, 14, 16, 18, 20 respectively. The nodes are joined by links in a circuit running ABDYXA, a link 22 joining nodes A and B. All of the links have a cost 1 except for a link 24 joining nodes Y and D which has a cost 5. When all of the links are operating, a packet arriving at node X and destined for node D will take the route XABD with a cost of 3, as opposed to the route XYD which has a cost of 6. Similarly, a packet arriving at node Y destined for node D will take route YXABD with a cost of 4 rather than YD with a cost of 5. If the link 22 between nodes A and B fails then node A advertises the failure by sending out an LSP effectively setting the cost for link 22 to "infinity". At some point this LSP will have reached X allowing it to update its LSDB but will not yet have arrived at node Y. As a result a packet now arriving at node X destined for node D will be forwarded towards Y as part of the route XYD at a cost 6 as opposed to the route XABD at a cost infinity. However when that packet reaches node Y, as node Y still records the cost of the link 22 between nodes A and B as 1, according to its SPF the lowest cost route is still via XABD at a cost 4. Accordingly the packet is returned to node X which again tries to send it to node Y and so forth. It will be seen that a loop of this nature can be a direct loop between two nodes or an indirect loop around a circuit of nodes.

Loops of this nature are undesirable because they use up bandwidth on the network until the packets are dropped when the hop count reaches the appropriate threshold.

One proposed solution to advertising link failure is described in Paolo Narvaez, Kai-Yeung Siu and Hong-Yi Tzeng, "Fault-Tolerant Routing in the Internet without Flooding", proceedings of the 1999 IEEE Workshop on Fault-Tolerant Parallel and Distributed Systems, San Juan, Puerto Rico, April 1999. According to this solution when a link fails, rather than flooding the network with LSPs only those nodes on the shortest or all "restoration paths" around the failed link are notified and each of those nodes updates its routing table only in relation to the set of destinations affected by the link failure. As a result packets are forced along a restoration path. However this approach requires significant perturbation of the routing protocols at each node involved, and temporary loops may be formed.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for advertising a link cost on a data communication network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

| 1.0 | General Overview |
| 2.0 | Structural and Functional Overview |
| 3.0 | Method of Advertising a Link Cost |
| 4.0 | Implementation Mechanisms—Hardware Overview |
| 5.0 | Extensions and Alternatives |

1.0 General Overview

The needs identified in the foregoing Background, and other needs and objects that will become apparent for the following description, are achieved in the present invention, which comprises, in one aspect, a method for advertising a link cost in a data communications network. The network has as components nodes and links. A node detects a change of state of an adjacent component having an associated link between an activated and a deactivated state or vice versa. The associated link cost is varied by an incremental value and the varied cost is advertised.

Because the link cost is varied incrementally, rather than immediately to its final value, loops are not set up in the remainder of the network.

In other aspects, the invention encompasses a computer apparatus and a computer-readable medium configured to carry out the foregoing steps.

2.0 Structural and Functional Overview

The method can be further understood with reference once again to the embodiments shown in FIG. 1, which depicts an illustrative network diagram showing a potential route configuration. A data communication network comprises nodes A, B, D, X, Y and links 22, 24, 26. Network 10 comprises for example the Internet or a sub-network such as a routing domain or a virtual network. Each link 22, 24, 26 is labeled with an associated link cost, such as "1," "5," etc., which is stored in a routing database at each node in association with information identifying the links. Each node A, B, D, X, Y comprises one or more hardware or software elements that individually or collectively implement the processes described herein.

Figure 3A:
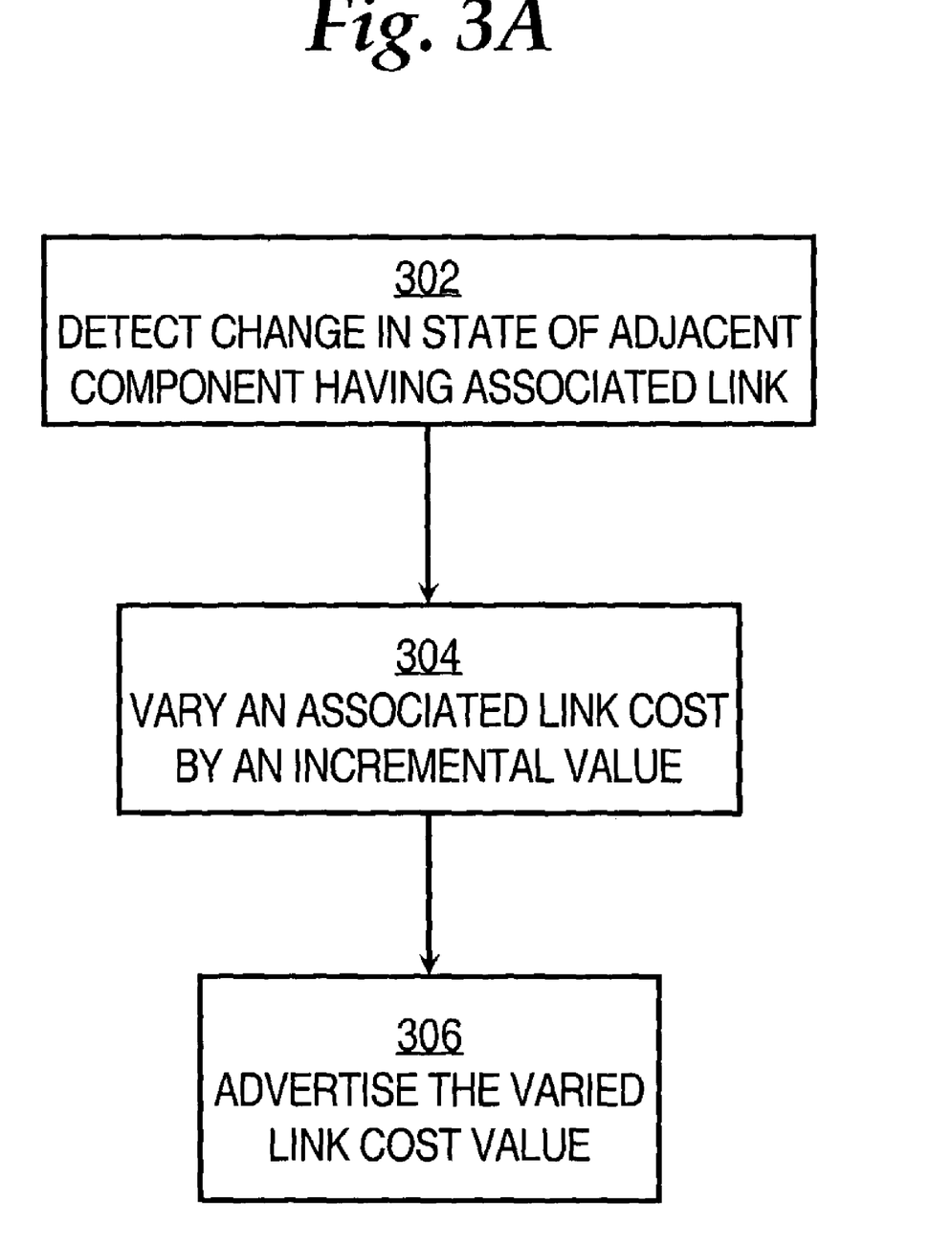
FIG. 3A is a flow diagram illustrating a high-level view of a method of advertising a link cost on a data communication network.

FIG. 3A is a flow diagram illustrating a high-level view of a method of advertising a link cost on a data communication network. In block 302, a change in the state of an adjacent component having an associated link is detected. Changes in state may include failure of a component, deactivation of a component due to planned downtime, activation of a component, etc. In block 304, a link cost value, for a link associated with the component that underwent a change in state, is varied by an incremental value. Varying the link cost value may include incrementing (increasing) the link cost value, decrementing (decreasing) the link cost value, modifying the link cost value by a multiplier or other factor, etc. In block 306, the varied link cost value is advertised to other nodes in the network.

For example, with reference to FIG. 1, a first node A is communicatively coupled to an adjacent second node B by link 22, and a third node X is coupled to node A by link 28. When node X needs to forward a packet to node A, in normal operation X will forward the packet using link 28, because the cost of link 28 is "1" whereas the cost of following links 26, 24, 23, 22 to node A is "8." When the adjacent component comprising link 22 fails or is deactivated in any other manner such as planned downtime or diverting around a congested link, node A advertises this, incrementally increasing the associated link cost 1 in its routing database, waits for the advertisement to propagate and then increments the associated link cost again. As a result, after the first advertised increment has reached node X then node X will forward the packet to node A as this is still the lowest cost route. The packet is lost but this is preferable to setting up a bandwidth consumed loop as higher level reliable transport protocols will cause node X to resend the packet to node A.

Once the first increment has reached all of the nodes, then as nodes X and Y "see" the same cost for link 22 the link cost can be incremented again and advertised.

In the following discussion the optimum size of the increment and the time interval between successively advertised increments will be discussed in more detail. It will also be apparent that the invention can be applied equally to a change of state when a link is activated for example when it is brought back into operation by reducing the cost by an appropriate increment from a starting value of infinity in a latter case.

The method is useful for planned downtime and, as it is designed to operate within the context of existing router protocol it does not disturb those protocols. Furthermore reconfiguration of remote nodes or routers is not required.

3.0 Method of Advertising a Link Cost

Figure 2:
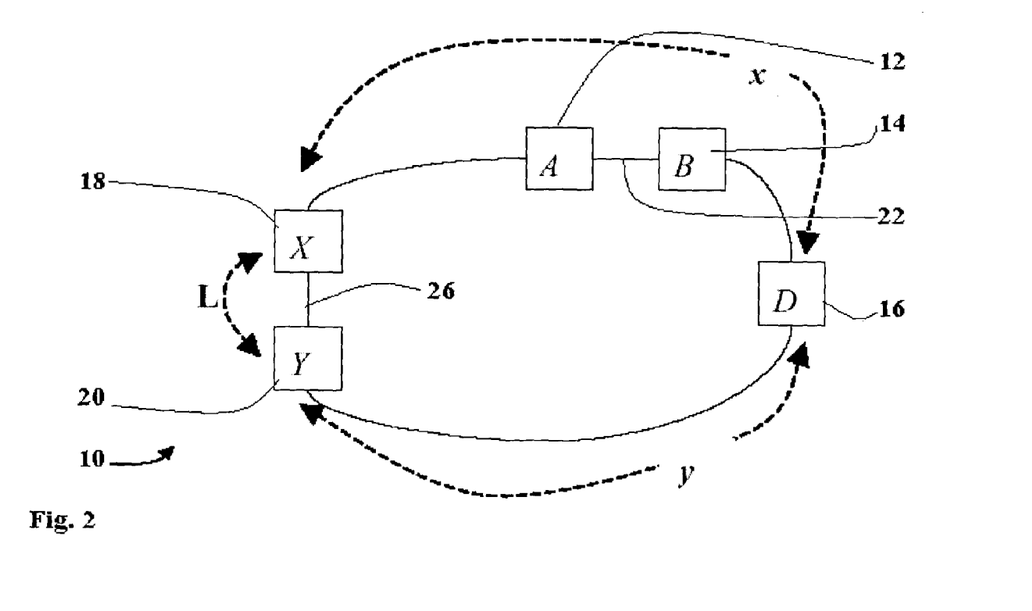
FIG. 2 shows a generalized network diagram corresponding to that of FIG. 1.

FIG. 2 shows a generalized network diagram corresponding to that of FIG. 1. Referring to FIG. 2 it will be seen that the link costs shown in FIG. 1 are replaced by generalized link costs x, L and y. Link cost x represents the generalized cumulative cost of links between node X and D, link cost L represents the link cost between node X and Y and link cost y represents the link cost between nodes Y and D. The link 26 between nodes X and Y is, in this example, symmetrical, i.e. the cost of the link is the same in both directions In other embodiments, link costs may vary according to packet forwarding direction on a link.

In this system a loop is possible if the following conditions hold true when a link A, B is incremented by i:
cost from X to D via A, B cost from X to D via Y, and
cost from Y to D not via X cost from Y to D via XAB.
This can be represented mathematically:

x+i L+y and y L+x.

Combining these produces the expression: i 2L.
Or, for no loops: i<2L.

In other words the condition that there can be no loop for any choice of X, Y, D in the network is that any increment is strictly less than twice the minimum link cost in the network (as this is the safest assumption). For a network with a minimum link cost of 1 this gives a maximum safe link cost increment of 1.

This approach can be extended to a system in which nodes X and Y are not necessarily adjacent and where the link or loop costs between nodes X and Y is asymmetric. In the case, in general, a loop is only possible around a set of two or more nodes if the increment is greater than or equal to the cost of traversing the loop. In those circumstances it can be seen that the above inequality still applies, as no loop cost will be less than twice the minimum link cost in the network (as the loop must traverse at least two links).

In the more general case still there may be multiple failures. In a first case, where m "additive" increments occur in a common path, then the condition for freedom from loops is:

mi<2L.

If the increments are not additive, i.e. they lie in parallel paths), then the condition i<2L still applies as they cannot influence the same cost at the same time.

One instance where this can take place is if a node fails as this will cause the simultaneous failure of all links to it. In a case where the node only has two links then the normal condition applies for the minimum increment, i.e., m=1, as the failures are not "additive," i.e., they do not lie in the same path (which is broken by the failed node). Where there are more than two links to a node then it is possible for additive increments to take place but the maximum value of m is m=2 as no more than two links can lie in a common path through the failed node. As a result in a network having m concurrent link failures and n concurrent node failures (assuming that they must be additive as the worst case scenario, the inequality to avoid loops is (m+2n) i less than 2L.

It can therefore be guaranteed that if the cost of a failed network component is incremented in steps of i or less and then a further increment is advertised only after a time which guarantees that all nodes have received and processed the updated information, the possibility of loops will not be introduced.

Figure 3B:
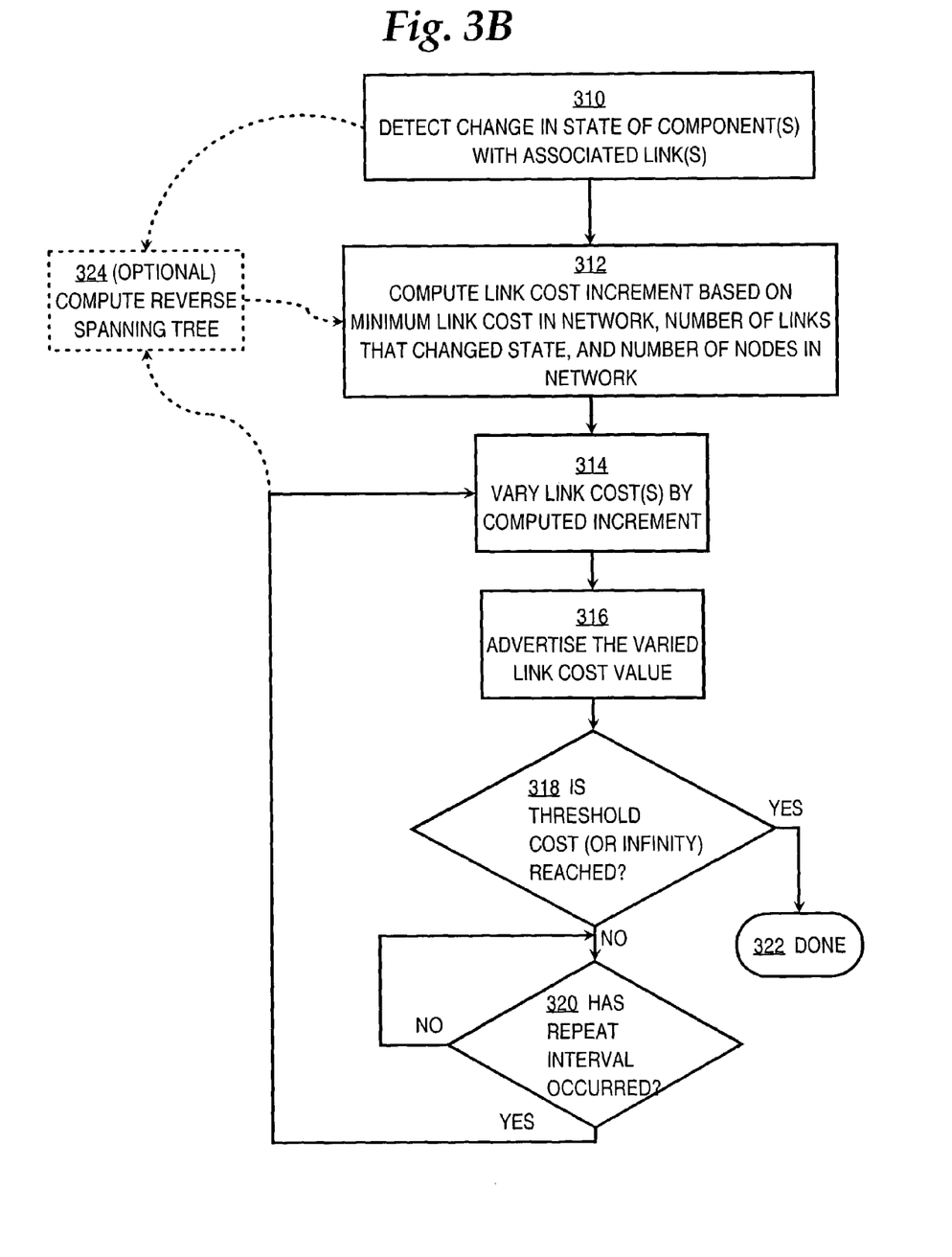
FIG. 3B is a flow diagram illustrating an alternative embodiment of a method of advertising a link cost on a data network.

FIG. 3B is a flow diagram illustrating an alternative embodiment of a method of advertising a link cost on a data network. In block 310, a change is detected in the state of one or more components having associated links. As in FIG. 3A, block 302, changes in state may include failure of a component, deactivation of a component due to planned downtime, activation of a component, etc.

In block 312, a link cost increment is computed, based on the minimum link cost in the network, the number of links for which a state change was detected in block 310, and the number of nodes in the network. In one embodiment, the link cost increment is computed such that for a change of state of m links and n nodes an incremental value i meets a condition (m+2n) i<2 L, where L is a minimum link cost on the network.

In block 314, the link costs are varied for links associated with components for which a state change was detected in block 302. Varying the link cost value may include incrementing (increasing) the link cost value, decrementing (decreasing) the link cost value, modifying the link cost value by a multiplier or other factor, etc. Most commonly, when the detected state change for a component indicates deactivation or failure, the associated link cost is decremented by the computed link cost increment value, and when a detected state change indicates re-activation, the link cost is incremented by the link cost increment value.

In block 316, the link cost value is advertised to other nodes in the network. In block 318, a test is performed to determine whether the varied link cost value has reached either a threshold cost value or a value approximating infinity. Use of the test of block 318 is described further below. If the test of block 318 is true, then there is no further need to increment and advertise link cost values, and processing completes at block 322.

In block 320, a test is performed to determine whether a specified repeat interval time has elapsed. If so, then control passes to block 314, in which the link costs are varied again by the previously computed increment, and then the new varied link cost value is advertised again in block 316.

In an optimization an increment can be generated as soon as it can be guaranteed that no node will receive the increment before any of its neighbors have received and processed the previous increment, i.e. after a delay representing the sum of the maximum expected propagation delay between any pair of adjacent nodes and the maximum expected difference in delay between receiving an LSP and the result of the SPF computation based on that LSP being used for forwarding traffic. This delay will be measurable or known based on the specific network components and configuration in use and can, for example, be configured as a management parameter.

As a further optimization it will be recognized that any increments in a failed link cost will only affect links lying on a common path with the failed link. Thus, rather than identifying the smallest link cost on the network, only the smallest link cost in the reverse spanning tree rooted at the far end of the failed link, and which traverses the failed link, is considered. The "reverse spanning tree", sometimes termed a "sink tree," shows the optimum route for each node from which the node is reachable. Accordingly, as shown in block 324, optionally a reverse spanning tree is computed before a link cost increment is computed in block 312. Yet a further optimization is to recompute the reverse spanning tree, and hence the maximum permissible next increment, after each increment. Accordingly, control may transfer to block 324 from block 320, as shown in FIG. 3B, rather than directly from block 320 to block 314. This may result in the previous lowest cost link being excluded as a result of which the maximum increment can be increased. Also, for successive recalculation it is likely that the reverse spanning tree will shrink as less and less lowest cost routes include the increasing cost of the failed link.

Where in conjunction with the above described method, repair paths are being calculated for a failed component according to any appropriate mechanism, in particular a failed node, then in a further optimization incrementing of the cost is synchronized between neighboring nodes to the failed node such that the nodes await incremented LSPs from each other neighbor node for which a repair path is available before issuing a further increment.

Referring again to the test of block 318, it will be recognized that as a further optimization it is not necessary to continue to increment the link cost to infinity especially as the true value which represents infinity can be very high. In fact it is only necessary to increment the cost until a threshold cost at which the cost of the link is such that no nodes in the network will compute a route using it. In the case of link failure this is guaranteed to have occurred when the cost of the AB link has been incrementally increased to the point where it is greater than the minimum cost path from A to B not passing over the link AB. At that point the cost of a failed link can be increased to "infinity" in one final jump. In the case of failure of a node B the link cost is incremented until it is greater than, for all nodes X, the cost of AX via the shortest alternative path less the cost BX, where the values can be easily computed by running an SPF routed at A.

In order to minimize the convergence time, the increment cost can be optimized to minimize the number of advertised link cost changes within the increment value limits discussed above.

Although the above discussion relates to incremental increases in a link cost when a network component fails or is otherwise taken out of service, the approach can be applied equally in the case where a network component is introduced into service. In conventional systems this would effectively be achieved by advertising a link cost change to the new cost in a single jump down from "infinity" which once again can give rise to loops. In that case, according to the present method, the link cost is first advertised at the upper bound discussed above, i.e. the link cost of the minimum cost path not traversing the new component. This cost is then incrementally decreased, using the same increments and time intervals as for incrementally increasing costs until it reaches the configured value for the link cost. However the node advertising the costs can treat the link throughout as having its final configured cost which can cause data traffic to pass through the link sooner than would otherwise be the case.

The method described herein can be implemented on a specific node or router in software or hardware, using the network topology information resident on the router in its LSDB from which SPFs can be run for the specific node or indeed for any other node on the network.

In the first instance the change of state of a component such as component failure is detected at the node in any appropriate manner which can be, for example, medium specific. Alternatively a planned component activation or deactivation may be taking place—in either case a link cost advertisement as set out above can be implemented. The amount of the increment and the interval between increments can be calculated as discussed above. To the extent that computation is required based, for example, on network topology, this is in the present example done on-the-fly rather than use up computing time prior to the event making use of the network information in the LSDB at the node although this is an alternative. In the case where the link cost is incrementally increased, once the cost reaches infinity, or in an optimization, an upper bound value as discussed above the node can increase the cost to "infinity" taking the component out of service. Similar considerations apply to bringing a component into service.

4.0 Implementation Mechanisms—Hardware Overview

Figure 4:
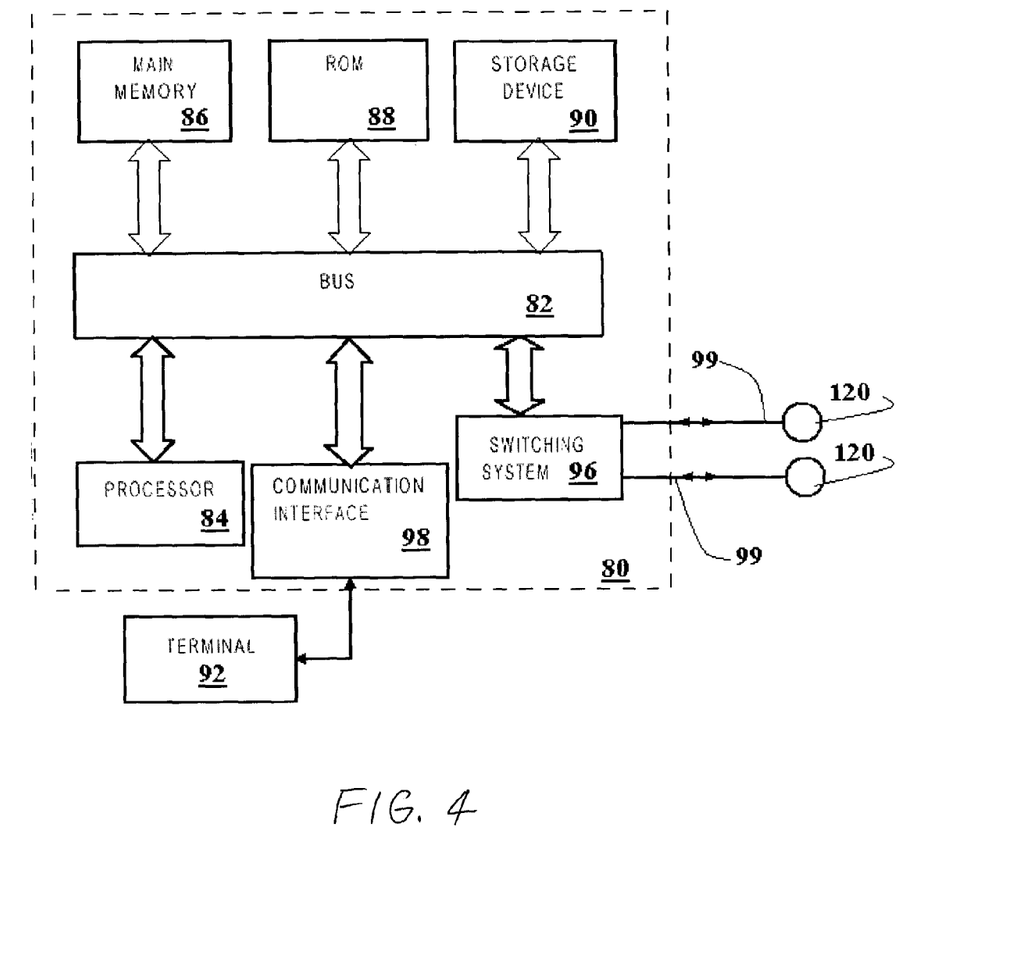
FIG. 4 is a block diagram that illustrates a computer system upon which an embodiment may be implemented.

FIG. 4 is a block diagram that illustrates a computer system 80 upon which an embodiment of the invention may be implemented. The preferred embodiment is implemented using one or more computer programs running on a network element such as a router device. Thus, in this embodiment, the computer system 80 is a router.

Computer system 80 includes a bus 82 or other communication mechanism for communicating information, and a processor 84 coupled with bus 82 for processing information. Computer system 80 also includes a main memory 86, such as a random access memory (RAM), flash memory, or other dynamic storage device, coupled to bus 82 for storing information and instructions to be executed by processor 84. Main memory 86 also may be used for storing temporary variables or other intermediate information during execution of instructions to be executed by processor 84. Computer system 80 further includes a read only memory (ROM) 88 or other static storage device coupled to bus 82 for storing static information and instructions for processor 84. A storage device 90, such as a magnetic disk, flash memory or optical disk, is provided and coupled to bus 82 for storing information and instructions.

A communication interface 98 may be coupled to bus 82 for communicating information and command selections to processor 84. Interface 98 is a conventional serial interface such as an RS-232 or RS-422 interface. An external terminal 92 or other computer system connects to the computer system 80 and provides commands to it using the interface 98. Firmware or software running in the computer system 80 provides a terminal interface or character-based command interface so that external commands can be given to the computer system.

A switching system 96 is coupled to bus 82 and has an input interface and a respective output interface (commonly designated 99) to external network elements. The external network elements may include a plurality of additional routers 120 or a local network coupled to one or more hosts or routers, or a global network such as the Internet having one or more servers. The switching system 96 switches information traffic arriving on the input interface to output interface 99 according to pre-determined protocols and conventions that are well known. For example, switching system 96, in cooperation with processor 84, can determine a destination of a packet of data arriving on the input interface and send it to the correct destination using the output interface. The destinations may include a host, server, other end stations, or other routing and switching devices in a local network or Internet.

The computer system 80 implements as a router acting as a node the above described method of advertising a link cost where, upon a change of state of a link 99 or a router 120 the associated link cost of link 99 is varied incrementally. According to one embodiment of the invention, the implementation is provided by computer system 80 in response to processor 84 executing one or more sequences of one or more instructions contained in main memory 86. Such instructions may be read into main memory 86 from another computer-readable medium, such as storage device 90. Execution of the sequences of instructions contained in main memory 86 causes processor 84 to perform the process steps described herein. One or more processors in a multi-processing arrangement may also be employed to execute the sequences of instructions contained in main memory 86. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 84 for execution. Such a medium may take many forms, including but not limited to, non-volatile media, volatile media, and transmission media. Non-volatile media includes, for example, optical or magnetic disks, such as storage device 90. Volatile media includes dynamic memory, such as main memory 86. Transmission media includes coaxial cables, copper wire and fiber optics, including the wires that comprise bus 82. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 84 for execution. For example, the instructions may initially be carried on a magnetic disk of a remote computer. The remote computer can load the instructions into its dynamic memory and send the instructions over a telephone line using a modem. A modem local to computer system 80 can receive the data on the telephone line and use an infrared transmitter to convert the data to an infrared signal. An infrared detector coupled to bus 82 can receive the data carried in the infrared signal and place the data on bus 82. Bus 82 carries the data to main memory 86, from which processor 84 retrieves and executes the instructions. The instructions received by main memory 86 may optionally be stored on storage device 90 either before or after execution by processor 84.

Interface 99 also provides a two-way data communication coupling to a network link that is connected to a local network. For example, the interface 99 may be an integrated services digital network (ISDN) card or a modem to provide a data communication connection to a corresponding type of telephone line. As another example, the interface 99 may be a local area network (LAN) card to provide a data communication connection to a compatible LAN. Wireless links may also be implemented. In any such implementation, the interface 99 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the worldwide packet data communication network now commonly referred to as the "Internet". The local network and the Internet both use electrical, electromagnetic or optical signals that carry digital data streams. The signals through the various networks and the signals on the network link and through interface 99, which carry the digital data to and from computer system 80, are exemplary forms of carrier waves transporting the information.

Computer system 80 can send messages and receive data, including program code, through the network(s), network link and interface 99. In the Internet example, a server might transmit a requested code for an application program through the Internet, ISP, local network and communication interface 98. In accordance with the invention, one such downloaded application provides for the method as described herein.

The received code may be executed by processor 84 as it is received, and/or stored in storage device 90, or other non-volatile storage for later execution. In this manner, computer system 80 may obtain application code in the form of a carrier wave.

5.0 Extensions and Alternatives

The method steps set out can be carried out in any appropriate order and aspects from the examples and embodiments described juxtaposed or interchanged as appropriate. It will be appreciated that any appropriate routing protocol can be used such as Intermediate System—Intermediate System (IS-IS) or Open Shortest Path First (OSPF). Similarly any appropriate network can provide the platform for implementation of the method.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of advertising a link cost in a data communication network having as a components nodes and links, in which a node carries out the computer-implemented steps of:
   maintaining link costs for the links, wherein the node calculates paths through the links and nodes of the network based at least on the link costs;
   detecting a change of state of an adjacent component having an associated link between activated and deactivated or vice versa;
      wherein, prior to the change of state, the node advertised to the network that the associated link had an associated link cost of a first value;
   in response to detecting the change of state, repeating two or more iterations of:
   (1) raising or lowering the associated link cost to a new value that is different than the first values; and
   (2) advertising to the network that the associated link cost is the new value;
   wherein for at least a first iteration of the two or more iterations, the new value of the associated link cost is less than a value that represents infinity;
   wherein the method is performed by a computing device at which the node is implemented.

2. A method as claimed in claim 1, in which steps (1) and (2) are repeated at predetermined intervals.

3. A method as claimed in claim 1, in which repeating the two or more iterations comprises performing at least the first iteration and a second iteration, wherein the node waits to begin the second iteration until a time at which all nodes on the network are expected to have received and processed the associated link cost as advertised in the first iteration.

4. A method as claimed in claim 1, in which repeating the two or more iterations comprises performing at least the first iteration and a second iteration, wherein the node waits to begin the second iteration until a time at which all pairs of adjacent nodes are expected to have received and processed the associated link cost as advertised in the first iteration.

5. A method as claimed in claim 1, in which repeating the two or more iterations comprises repeating steps (1) and (2) until the new value has been raised to or above a threshold cost at which no node on the network will compute a route using the associated link.

6. A method as claimed in claim 1, in which the change of state is from activated to deactivated, and wherein the step of raising or lowering the associated link cost comprises increasing the associated link cost by an incremental value.

7. A method as claimed in claim 1, in which the change of state is from deactivated to activated, and wherein the step of raising or lowering the associated link cost comprises decreasing the associated link cost by an incremental value.

8. A method as claimed in claim 1, in which the step of raising or lowering the associated link cost comprises raising or lowering the associated link cost by an incremental value, wherein the incremental value is selected to be less than twice a minimum link cost of a predetermined set of links on the network.

9. A method as claimed in claim 8, in which the node has an adjacent node reachable along the associated link and the predetermined set of links comprises all links over which the adjacent node is reachable via the associated link.

10. A method as claimed in claim 9 further comprising the step of constructing a reverse spanning tree rooted at the adjacent node including paths containing the associated link, and the wherein the predetermined set of links comprise all links included in the reverse spanning tree.

11. A method as claimed in claim 1, in which the step of raising or lowering the associated link cost comprises raising or lowering the associated link cost by an incremental value i, wherein, for a change of state on m links and n nodes, the incremental value i meets a condition $(m+2n)i<2L$, where L is a minimum link cost on the network.

12. A non-transitory computer-readable storage medium comprising one or more sequences of instructions for advertising a link cost in a data communication network having as components nodes and links, which instructions, when executed by one or more processors, causes the one or more processors to perform the step of:
    maintaining link costs for the links, wherein the node calculates paths through the links and nodes of the network based at least on the link costs;
    detecting a change of state of an adjacent component having an associated link between activated and deactivated or vice versa;
        wherein, prior to the change of state, the node advertised to the network that the associated link had an associated link cost of a first value;
    in response to detecting the change of state, repeating two or more iterations of:
    (1) raising or lowering the associated link cost to a new value that is different than the first values; and
    (2) advertising to the network that the associated link cost is the new value;
    wherein for at least a first iteration of the two or more iterations, the new value of the associated link cost is less than a value that represents infinity.

13. A non-transitory computer-readable storage medium as claimed in claim 12, in which the instructions, when executed by the one or more processors, cause steps (1) and (2) are repeated at predetermined intervals.

14. A non-transitory computer-readable storage medium as claimed in claim 12, in which repeating the two or more iterations comprises performing at least the first iteration and a second iteration, wherein the node waits to begin the second iteration until a time at which all nodes on the network are expected to have received and processed the associated link cost as advertised in the first iteration.

15. A non-transitory computer-readable storage medium as claimed in claim 12, in which repeating the two or more iterations comprises performing at least the first iteration and a second iteration, wherein the node waits to begin the second iteration until a time at which all pairs of adjacent nodes are expected to have received and processed the associated link cost as advertised in the first iteration.

16. A non-transitory computer-readable storage medium as claimed in claim 12, in which repeating the two or more iterations comprises repeating steps (1) and (2) until the new value has been raised to or above a threshold cost at which no node on the network will compute a route using the associated link.

17. A non-transitory computer-readable storage medium as claimed in claim 12, in which the change of state is from activated to deactivated, and wherein the step of raising or lowering the associated link cost comprises increasing the associated link cost by an incremental value.

18. A non-transitory computer-readable storage medium as claimed in claim 12, in which the change of state is from deactivated to activated, and wherein the step of raising or lowering the associated link cost comprises decreasing the associated link cost by an incremental value.

19. A non-transitory computer-readable storage medium as claimed in claim 12, comprising raising or lowering the associated link cost by an incremental value, wherein the incremental value is selected to be less than twice a minimum link cost of a predetermined set of links on the network.

20. A non-transitory computer-readable storage medium as claimed in claim 19, in which the node has an adjacent node reachable along the associated link and the predetermined set of links comprises all links over which the adjacent node is reachable via the associated link.

21. A non-transitory computer-readable storage medium as claimed in claim 20, in which the one or more processors further perform the step of constructing a reverse spanning tree rooted at the adjacent node including paths containing the associated link, and the wherein the predetermined set of links comprise all links included in the reverse spanning tree.

22. A non-transitory computer-readable storage medium as claimed in claim 12, comprising raising or lowering the associated link cost comprises raising or lowering the associated link cost by an incremental value i, wherein, for a change of state on m links and n nodes, the incremental value i meets a condition $(m+2n)i<2L$, where L is a minimum link cost on the network.

23. An apparatus for advertising a link cost in a data communication network having as a components nodes and links, comprising:
    means for maintaining link costs for the links, wherein the node calculates paths through the links and nodes of the network based at least on the link costs;
    means for detecting a change of state of an adjacent component having an associated link between activated and deactivated or vice versa;
        wherein, prior to the change of state, the node advertised to the network that the associated link had an associated link cost of a first value;
    means for, in response to detecting the change of state, repeating two or more iterations of:
    (1) raising or lowering the associated link cost to a new value that is different than the first values; and
    (2) advertising to the network that the associated link cost is the new value;
    wherein for at least a first iteration of the two or more iterations, the new value of the associated link cost is less than a value that represents infinity.

24. An apparatus as claimed in claim 23, in which the means for repeating the two or more iterations comprises means for repeating steps (1) and (2) predetermined intervals.

25. An apparatus as claimed in claim 23, in which the means for repeating the two or more iterations comprises performing at least the first iteration and a second iteration, wherein the node waits to begin the second iteration until a time at which all nodes on the network are expected to have received and processed the associated link cost as advertised in the first iteration.

26. An apparatus as claimed in claim 23, in which the means for repeating the two or more iterations comprises performing at least the first iteration and a second iteration, wherein the node waits to begin the second iteration until a time at which all pairs of adjacent nodes are expected to have received and processed the associated link cost as advertised in the first iteration.

27. An apparatus as claimed in claim 23, in which the means for repeating the two or more iterations comprises repeating steps (1) and (2) until the new value has been raised to or above a threshold cost at which no node on the network will compute a route using the associated link.

28. An apparatus as claimed in claim 23, in which the change of state is from activated to deactivated, and wherein the step of raising or lowering the associated link cost comprises increasing the associated link cost by an incremental value.

29. An apparatus as claimed in claim 23, in which the change of state is from deactivated to activated, and wherein the step of raising or lowering the associated link cost comprises decreasing the associated link cost by an incremental value.

30. An apparatus as claimed in claim 23, in which the raising or lowering the associated link cost comprises raising or lowering the associated link cost by an incremental value, wherein the incremental value is selected to be less than twice a minimum link cost of a predetermined set of links on the network.

31. An apparatus as claimed in claim 30, in which an adjacent node is reachable along the associated link and the predetermined set of links comprises all links over which the adjacent node is reachable via the associated link.

32. An apparatus as claimed in claim 31 further comprising means for constructing a reverse spanning tree rooted at the adjacent node including paths containing the associated link, and the wherein the predetermined set of links comprise all links included in the reverse spanning tree.

33. An apparatus as claimed in claim 23, in which the raising or lowering the associated link cost comprises raising or lowering the associated link cost by an incremental value i, wherein, for a change of state on m links and n nodes, the incremental value i meets a condition $(m+2n)i<2L$, where L is a minimum link cost on the network.

34. An apparatus for advertising a link cost in a data communication network having as a components nodes and links, comprising:
  a processor;
  a network interface communicatively coupled to the processor to communicate one or more packet flows among the processor and a network via adjacent components to the processor; and
  a computer-readable medium accessible to the processor and comprising one or more sequences of instructions for advertising a link cost in a data communication network having as components nodes and links, which instructions, when executed by the processor, cause the processor to perform the steps of:
  maintaining link costs for the links, wherein the node calculates paths through the links and nodes of the network based at least on the link costs;
  detecting a change of state of an adjacent component having an associated link between activated and deactivated or vice versa;
    wherein, prior to the change of state, the node advertised to the network that the associated link had an associated link cost of a first value;
    in response to detecting the change of state, repeating two or more iterations of:
      (1) raising or lowering the associated link cost to a new value that is different than the first values; and
      (2) advertising to the network that the associated link cost is the new value;
    wherein for at least a first iteration of the two or more iterations, the new value of the associated link cost is less than a value that represents infinity.

35. An apparatus as claimed in claim 34, in which the instructions, when executed by the one or more processors, cause steps (1) and (2) to be repeated at predetermined intervals.

36. An apparatus as claimed in claim 34, in which repeating the two or more iterations comprises performing at least the first iteration and a second iteration, wherein the node waits to begin the second iteration until a time at which all nodes on the network are expected to have received and processed the associated link cost as advertised in the first iteration.

37. An apparatus as claimed in claim 34, in which repeating the two or more iterations comprises performing at least the first iteration and a second iteration, wherein the node waits to begin the second iteration until a time at which all pairs of adjacent nodes are expected to have received and processed the associated link cost as advertised in the first iteration.

38. An apparatus as claimed in claim 34, in which repeating the two or more iterations comprises repeating steps (1) and (2) until the new value has been raised to or above a threshold cost at which no node on the network will compute a route using the associated link.

39. An apparatus as claimed in claim 34, in which the change of state is from activated to deactivated, and wherein the step of raising or lowering the associated link cost comprises increasing the associated link cost by an incremental value.

40. An apparatus as claimed in claim 34, in which the change of state is from deactivated to activated, and wherein the step of raising or lowering the associated link cost comprises decreasing the associated link cost by an incremental value.

41. An apparatus as claimed in claim 34, in which the raising or lowering the associated link cost comprises raising or lowering the associated link cost by an incremental value, wherein the incremental value is selected to be less than twice a minimum link cost of a predetermined set of links on the network.

42. An apparatus as claimed in claim 41, in which an adjacent node is reachable along the associated link and the predetermined set of links comprises all links over which the adjacent node is reachable via the associated link.

43. An apparatus as claimed in claim 42 further comprising means for constructing a reverse spanning tree rooted at the adjacent node including paths containing the associated link, and the wherein the predetermined set of links comprise all links included in the reverse spanning tree.

44. An apparatus as claimed in claim 34, in which the raising or lowering the associated link cost comprises raising or lowering the associated link cost by an incremental value i, wherein, for a change of state on m links and n nodes, the incremental value i meets a condition $(m+2n)i<2L$, where L is a minimum link cost on the network.

45. An apparatus as claimed in claim 34 comprising a router.

* * * * *